United States Patent [19]

Kanamori et al.

[11] Patent Number: 5,241,373
[45] Date of Patent: Aug. 31, 1993

[54] APPARATUS FOR CORRECTION OF COLOR SIGNAL VALUES

[75] Inventors: Katsuhiro Kanamori, Kawasaki; Hidehiko Kawakami, Tokyo; Hiroaki Kotera, Kawasaki, all of Japan

[73] Assignee: Matsushita Electric Industrial Co., Ltd., Osaka, Japan

[21] Appl. No.: 700,692

[22] Filed: May 16, 1991

[30] Foreign Application Priority Data

May 16, 1990 [JP] Japan .................. 2-127245

[51] Int. Cl.$^5$ .......................... H04N 9/64; H04N 1/46
[52] U.S. Cl. ...................... 358/27; 358/518; 358/29
[58] Field of Search ........ 358/27, 28, 32, 80, 358/29, 22, 75; 382/54

[56] References Cited

U.S. PATENT DOCUMENTS 4,275,413 6/1981 Sakamoto et al. .
4,907,076 3/1990 Ohsawa .................. 358/80

FOREIGN PATENT DOCUMENTS 58-16180 3/1983 Japan .
0313066 1/1991 Japan .

Primary Examiner—James J. Groody
Assistant Examiner—Sherrie Hsia
Attorney, Agent, or Firm—Lowe, Price, LeBlanc & Becker

[57] ABSTRACT

A color value correction apparatus for converting each of successive combinations of input tricolor digital values into an output color value in accordance with predetermined data stored in memory, includes three table memories which store values which are respective differences between color values corresponding to vertices of unit tetrahedra in a color space and a reference color value that is common to all of a set of tetrahedra forming one of an array of unit cubes or parallelepipeds which constitute that color space, and also includes a table memory that stores these reference color values. To obtain an interpolated output value, each of these memories is addressed three-dimensionally by the high-order bits of an input tricolor value combination to thereby specify one of the unit cubes or parallelepipeds, and the difference value memories are in addition addressed by a value, derived from the low-order bits of the input value combination, specifying a specific tetrahedron containing the interpolation point. An interpolated output value can thereby be obtained by executing only three multiplication operations followed by addition operations.

6 Claims, 6 Drawing Sheets

APPARATUS FOR CORRECTION OF COLOR SIGNAL VALUES

BACKGROUND OF THE INVENTION

1. Field of the Invention

The present invention relates to a color value correction apparatus for converting input color values of picture elements of a color image to corrected output color values, and in particular to a color value correction apparatus in which such conversion is executed by transform operations within a color space using real-time computations.

In general, such a color value correction apparatus is applicable to a color printer apparatus, color image display apparatus, color television camera, color pattern recognition apparatus, etc. It should be understood that the term "correction" as applied herein to color values is used in a very general sense, and can include for example the conversion of a combination of three or more color density values to a completely different type of value, e.g. a corresponding value of hue, or saturation.

2. Description of the Related Art

In the prior art, in image processing of a monocolor image, the information contained in each picture element of a picture consist only of luminance (i.e. density) information, which is one-dimensional information. Adjustment of the luminance values is usually executed by using a gamma transform, which can be done by real-time computation by using a table memory in which are stored values which provide an arbitrary non-linear conversion characteristic. Thus the manner in which the luminance values of a monocolor image are modified by such a gamma transform operation can be freely changed, simply by changing the contents of the table memory.

In the case of modifying the color values of the picture elements of a color picture too, in the prior art, a transform method is used in which the color picture is processed as if it consisted of a combination of three monocolor pictures. The values of these are expressed as respectively lying in R (red), G (green) and B (blue) planes, with the transform being executed by using respectively different table memories corresponding to these three planes. However with that type of processing, the color transform is actually being effected by one-dimensional processing, i.e. of the form:

$$R' = hR(R), G' = hG(G), \text{ and } B' = hB(B)$$

In color image processing, the information contained in each picture element is actually 3-dimensional information, expressable as a set of red, green and blue values in the form (R, G, B). Thus a true color transform operation should consist of a 3-dimensional transform that is executed upon that set of values, for each picture element, i.e. of the form $$R' = fR(R,G,B), G' = fG(R,G,B); \text{ and } B' = fB(R,G,B)$$

In recent years, an important type of color image processing technique has been based on converting the (R, G, B) value set for each picture element of a picture into a set of H (hue), L (luminance) and S (saturation) values, i.e. of the form:

$$H = H(R, G, B).$$

That HLS transform is an example of a 3-dimensional transform method in which one output value is produced in response to a set of three input values. Another is required in color printing, in which it is generally necessary to convert each set of R, G, B input color values obtained by an optical scanning operation into a corresponding set of corrected red, green, blue values (with such converted values being designated in the following as R', B', G'), or a corresponding set of C (cyan), M (magenta), and Y (yellow) values, or a set of C, M, Y and B (black) values, i.e. for each picture element of the original image. In the following, each converted output value (e.g. a R' value or a C value, for example) produced by such a transform operation on an input combination of three R, G, B values will be referred to in general as a correction color value.

In future, therefore, it will be important to provide hardware for an apparatus whereby arbitrary types of such 3-dimensional color transform operations can be executed in real time. Such an apparatus should be configured to have a wide range of applicability. Use of table memories, i.e. look-up tables, will of course enable a widely applicable type of color transform apparatus to be realized. However, assuming that it requires 8 bits of data to express a single color value (i.e. a red, green, or blue value), it would be necessary to provide a very large memory capacity for such a table memory e.g. of the order of 16 Mbyte, if a sufficient number of output R', G', B'combinations is to be stored for achieving satisfactory resolution. Thus at the present time it is necessary to develop a dedicated new type of hardware for each specific real-time color image processing application. It has not been possible to realize a generally-applicable type of real-time color transform apparatus.

More specifically, a transform operation in which one output value (e.g. a R' value) is obtained in response to a 3-dimensional vector input value such as an R, G, B value combination, can be considered as being executed using a 3-dimensional color space. That color space consists of a regular rectangular lattice of points representing respective color correction values that are stored in a table memory, such that each color correction value can be addressed a uniquely corresponding combination of R, G, B input values. In the case of a conversion from R, G, B input value combinations to sets of three corrected output values such as sets of R', G', B' values, three of these color spaces (and hence three table memories) would be used, either concurrently or successively, to obtain each combination of R', G', B' output values. In the case of color printing, for example, it is usual to successively obtain separate arrays of corrected output values as separation images, for color separation printing, i.e. to first obtain all of the R' corrected output values for the picture elements of an original image, using one color space (one table memory), then all of the G' corrected output values, using a second color space (A) second table memory), then all of the B' values, using a third color space (i.e. a third table memory).

Each table memory is addressed three-dimensionally, by combinations of R, G, B values, so that each of these corrected output values is outputted when a corresponding input data value R, G, B set is supplied. However in order to avoid an excessively large amount of storage capacity being required for each table memory, as described hereinabove, the number of output color correction values that are stored in each table memory is made less than the number of possible input R, G, B combinations that may be supplied to the apparatus It is therefore necessary to interpolate an output color correction value for each input R, G, B color value combination that does not correspond to one of the color correction values stored in a table memory.

Various methods have been proposed for executing such interpolation. A prior art method and apparatus for effecting this type of interpolation to executed 3-dimensional color correction processing has been proposed in U.S. Pat. No. 4,275,413, entitled "Linear Interpolator for Color Correction." The basic principles of that invention are as follows, considering the derivation of only one type of corrected output values, e.g. R' values. A set these corrected output values are stored in a table memory, with the addresses of the memory being expressed as input R, G, B combinations, and with each of these R, G, B, address values consisting of high-order bits of an R, G, B input color value combination. Since each of these input high-order bit R, G, B address values has an equal number of bits, the contents of the memory can be expressed as a cubic color space formed of a regular array of points which correspond to respective R' corrected output values. These points define "unit cubes", each of whose 8 corner points corresponds to a specific R' value. For the purpose of interpolation, the unit cube is conceived as being divided into a fixed number of tetrahedra. The operation of the apparatus of that invention for generating a corrected output color value (e.g. a red value) in response to an input R, G, B combination is, basically, to first determine an interpolation position as being within a specific one of the plurality of tetrahedra within a specific one of the unit cubes (with that determination being made based upon the the high-order and low-order bits of each of the R, G and B values of that input combination). Each of the four R' output color values stored in the memory which correspond to the four vertices of the selected tetrahedron are then successively read out of the memory. In addition, a set of four weighting coefficients, selected in accordance with the particular tetrahedron that has been selected is generated, and each of the read-out R output color values is then multiplied by a specifically corresponding one of that set of weighting coefficients. The results of these four multiplication operations are then added together, to obtain the desired interpolated output R' color value.

Such a prior art color value correction apparatus enables various operations to be executed at high speed, such as color correction, interchanging specific colors, etc., while substantially preserving the tone gradation characteristics of the color image that is being processed. However the color value correction apparatus of the above prior art U.S. patent has various disadvantages. Firstly, in order to execute an interpolation operation to obtain an output color value (each R, G and B value constituting an output R,G,B color value combination) it is necessary to execute a total of four multiplication operations as described above, followed by an addition operation.

Moreover it is desirable to effect such non-linear color transform processing at extremely high speed, to achieve real-time operation. To achieve maximum speed, it is necessary to execute in parallel the multiplication operations that are required for an interpolation operation, then the execute the subsequent addition operations also in parallel. With the aforementioned U.S. patent, there are four multiplication operations which must be executed in parallel in that way, so that it is necessary to provide a total of four separate multipliers for that purpose. It would be preferable to use a color value correction apparatus which requires a smaller number of multipliers to execute such a transform interpolation operation, in order to simplify the hardware configuration of the apparatus.

Furthermore with that prior art apparatus, the four values corresponding to the apexes of a selected tetrahedron of a selected unit cube are successively read out from a memory by addressing that memory sequentially, with the values that are read being then held temporarily in respective registers. When all of these successive read-out operations has been completed, the aforementioned parallel multiplication operation can begin. Thus that prior art apparatus cannot achieve a very high speed of processing, due to that sequential memory read-out operation.

The assignees of the present invention have proposed, in a Japanese patent application having Provisional Publication No. 3-13066, with filing date of Jun. 9, 1989, a color value correction apparatus whose basic principles are similar to those described hereinabove, but in which a set of four table memories are used in parallel to store the color correction values corresponding to the respective vertices of each tetrahedron in the color space. In that way, a higher speed of operation can be achieved, since color correction values are read out from the table memories in parallel, to be used in parallel multiplication operations. However that has the disadvantage of not using the memory capacity with maximum efficiency, which can be achieved by storing color transform difference values between respective color correction values of a unit tetrahedron, as described in detail hereinafter. Such color transform difference values have a smaller range of variation of amplitude than the original color correction values from which they are derived, and so each can be stored as a datum formed of a smaller number of bits than is required to store an original color correction value.

Thirdly, human visual characteristics are not symmetrical with respect to each of the axes of a color space such as is used for transform operations in that prior art U.S. patent. Of the red, blue and green axes of such a color space, the green axis is the most important with regard to human visual characteristics. Thus, an effectively greater degree of interpolation accuracy can be obtained by increasing the resolution of the color space along the green axis, i.e., in concrete terms, by increasing the total number of addresses in which are stored respectively different G' output color values. That would require an increase in the number of bits used to address the green axis values of the color space, by comparison with the respective numbers of bits used to address the red and blue axes. However there is no provision for providing such an increased resolution along at least one axis of the color space, in prior art types of color value correction apparatus using a color space transform, such as the apparatus of the aforementioned U.S. patent.

SUMMARY OF THE INVENTION

It is an objective of the present invention to overcome the disadvantages of the prior art as set out above, by providing a color value correction apparatus enabling color transform operations to convert an input color signal consisting of successive multi-dimensional input values consisting of an arbitrary number of values such as red, green and blue values, to an output color signal which also consists of values each having an arbitrary number of dimensions, and further wherein the color transform operations include derivation of interpolated output signal values, without significant discontinuities between successively adjacent ones of such interpolated output signal values. It is moreover an objective of the present invention to provide such a color value correction apparatus, which will be capable of a higher speed of real-time operation than has been possible in the prior art, and moreover whereby interpolation can be easily executed. It is moreover an objective of the present invention to provide such a color value correction apparatus, whereby a higher degree of accuracy of interpolation is achieved for green color input values, by comparison with red and blue input values, of each of successive sets of red, green and blue input values.

To achieve the above objectives, the present invention provides a color value correction apparatus for converting each of successive sets of tricolor digital values of a tricolor input signal into a corrected output color value, comprising:

color transform reference value memory means having stored therein a plurality of color transform reference values, each of said reference values being a color correction value corresponding to one specific vertex of one of an array of unit rectangular parallelepipeds constituting a 3-dimensional color space, each of said unit rectangular parallelepipeds being divided into a set of unit tetrahedra each having said color transform reference value corresponding to a common vertex thereof;

color transform difference value memory means having stored therein a plurality of color transform difference values, each of said difference values being a difference between a color correction value corresponding to a vertex of one of said unit tetrahedra and said color transform reference value of the unit tetrahedron;

unit tetrahedron designation means responsive to respective sets of low-order bits of said each set of tricolor digital values for producing an output value indicating a specific one of said unit tetrahedra which contains an interpolation color correction value of said each set, said color transform reference value memory means being three-dimensionally addressed by respective sets of high-order bits of said each set of tricolor digital values, for producing a corresponding one of said reference values, and said difference value memory means being addressed three-dimensionally by said sets of high-order bits in conjunction with said output value from said unit tetrahedron designation means, for producing three output difference values corresponding to respective vertices of said specific one of the unit tetrahedra, within a specific one of said unit rectangular parallelepipeds;

weighting coefficient generating means responsive to said low-order bits for generating three weighting coefficients respectively corresponding to said three difference values; and arithmetic processing means for operating on said three difference values and said corresponding one of the difference values in conjunction with said three weighting coefficients, for producing an interpolated corrected color value corresponding to said each set of tricolor digital values.

Due the fact that color transform difference values, with respect to color transform reference values, are read out from the memory means together with these reference values, it becomes possible to obtain an interpolated output color value by executing only three multiplication operations, as opposed to the need to execute four multiplication operations in the prior art.

Moreover due to the fact that these color transform difference values and reference values are read out in parallel from the memory means, a high speed of operation is achieved.

DESCRIPTION OF PREFERRED EMBODIMENTS

Figure 2:
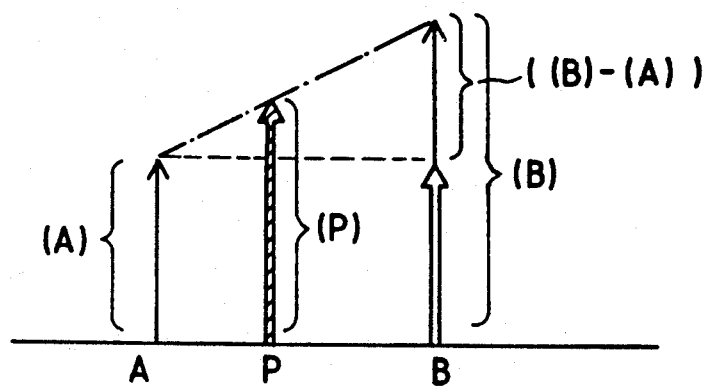
FIG. 2 is a diagram for illustrating a method of interpolation in one dimension, using difference values.

Before describing a preferred embodiment of the present invention, the basic principles of a method of interpolation used in the present invention will first be described, referring first to FIG. 2. In FIG. 2, A and B denote two input values which can be considered as being positioned in an input (1-dimensional) color space, i.e. a linear continuum. Each of these input values A, B has a corresponding output value, (A), (B) as shown. An interpolated output value (B) is to be obtained for an input point P which is located in the interpolation interval between the input values A and B. In the prior art, this is generally done by using two weighting coefficients a, b as follows:

$$(P) = a \times (A) + b \times (B) \qquad (1)$$

where $a + b = 1$. $\qquad (2)$

It is thus necessary to execute two multiplication operations to effect such a 1-dimensional interpolation. However it is equally possible to use a different interpolation method, whereby the interpolated output value (P) is obtained as:

$$(P) = (A) + b \times ((B) - (A)) \qquad (3)$$

In that case, the output value (A) is established as a reference output value, and a color transform difference value that is obtained by using that color transform reference value, i.e. $(B) - (A)$ is multiplied by a single coefficient b. Thus in that case it is only necessary to execute a single multiplication operation to effect the interpolation.

Figure 3:
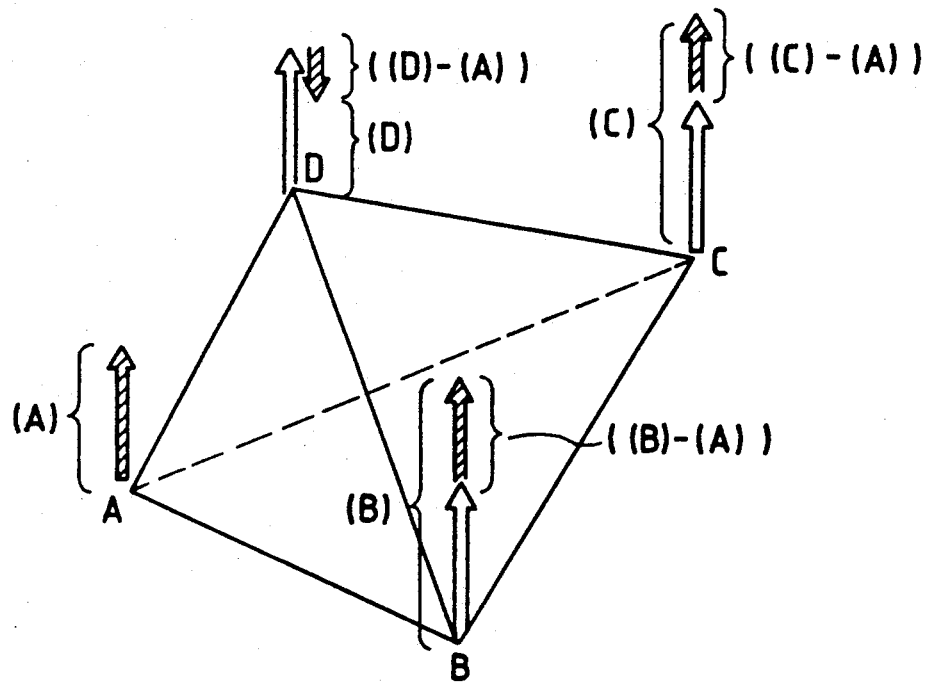
FIG. 3 is a diagram for illustrating a method of interpolation in three dimensions, using difference values.

The same principle can be extended to interpolation in a space having more than two dimensions. FIG. 3 illustrates the case of interpolation in three dimensions, with a unit tetrahedron as a unit space for the purposes of interpolation. With the method of the prior art U.S. invention described hereinabove, respective color correction values corresponding to the vertices of each such unit tetrahedron are stored in memory, and an interpolated color correction value (P) is obtained based on the the vertex color correction values of the corresponding unit tetrahedron (i.e. of the particular unit tetrahedron within which the interpolated value is located, at a point P, in the color space) by using the following equation:

$$(P) = a \times (A) + b \times (B) + c \times (C) + d \times (D) \qquad (4)$$

Again, a, b, c and d denote respective weighting coefficients. Thus in that case it is necessary to execute four multiplication operations to obtain each interpolated color correction value.

However it is also possible to designate a specific vertex of each unit tetrahedron as a reference point, e.g. designate the vertex A as a reference point, and the corresponding color correction value (A) as a color transform reference value which is stored in memory, and to derive respective reference values for the other three vertices of each unit tetrahedron, with respect to that color transform reference value. This is illustrated in FIG. 3. The vertices A, B, C, D of the tetrahedron correspond to a color transform reference value (A), and three color transform difference values ((B)−(A)), ((C)−(A)) and ((D)−(A)) respectively, whose respective magnitudes and polarities are indicated by the hatched-line arrows, with the value of (A) being indicated at each of the points B, C, D as a non-hatched arrow. In the case of interpolation within a color space, the values (A), (B), (C) and (D) are respective color correction values of the color space (e.g. R' color correction values). In the following, such color correction values (A), (B), (C), (D) will be referred to as basic color correction values, to distinguish these from the color transform difference values ((D)−(A)), etc. Each color transform reference value is of course always a basic color correction value.

In that case, an interpolated value (P) corresponding to a point P within a unit tetrahedron is obtained as:

$$(P) = (A) + b \times ((B) - (A)) + c \times \qquad (5)$$
$$((C) - (A)) + d \times ((D) - (A))$$

Thus with such an interpolation method, it is only necessary to execute three multiplication outputs to obtain an interpolated color correction value.

It is a basic feature of the present invention that this simple method of interpolation is utilized, to enable color transform operations to be freely executed at high speed.

Figure 4:
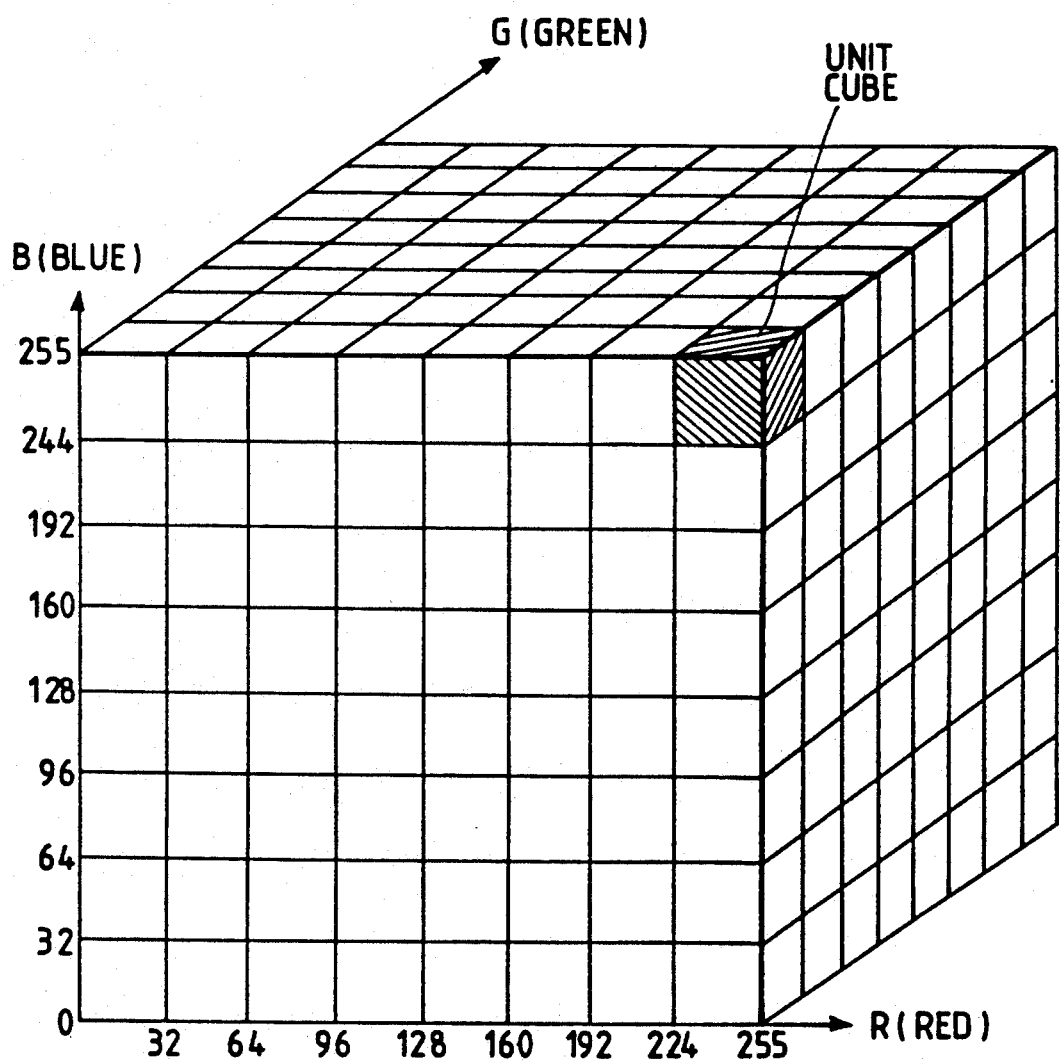
FIG. 4 shows an example of color space formed of a regular array of unit cubes.

The manner in which the weighting coefficients b to d are derived for this method of interpolation is as follows. First, each set of tricolor digital values (e.g. a set of R, G, B values, or C, Y, M values) of the stream of tricolor values constituting a tricolor input signal will be designated as (x), (y) and (z) respectively, each consisting of an identical fixed number of bits (which will be assumed to be 8 bits). Respective sets of high-order bits of these (x), (y) and (z) values (which will be assumed to be the highest-significance three bits of each value) will be designated as (x1), (y1) and (z1), while the remaining 5 low-order bits of each value will be designated as (x2), (y2) and (z2). Each combination of tricolor input values can be considered as defining a point in a 3-dimensional color space, as shown in FIG. 4, in which it is assumed that the (x), (y) and (z) input values are red, green and blue values respectively. That color space is formed of a regular array of unit cubes, and each cube (more exactly, one specific vertex of each cube) can be uniquely specified by the high-order bits (x1), (y1), (z1) of one corresponding tricolor input value combination. In this example there are 8×8×8, i.e. a total of 512 of the unit cubes.

Figure 5:
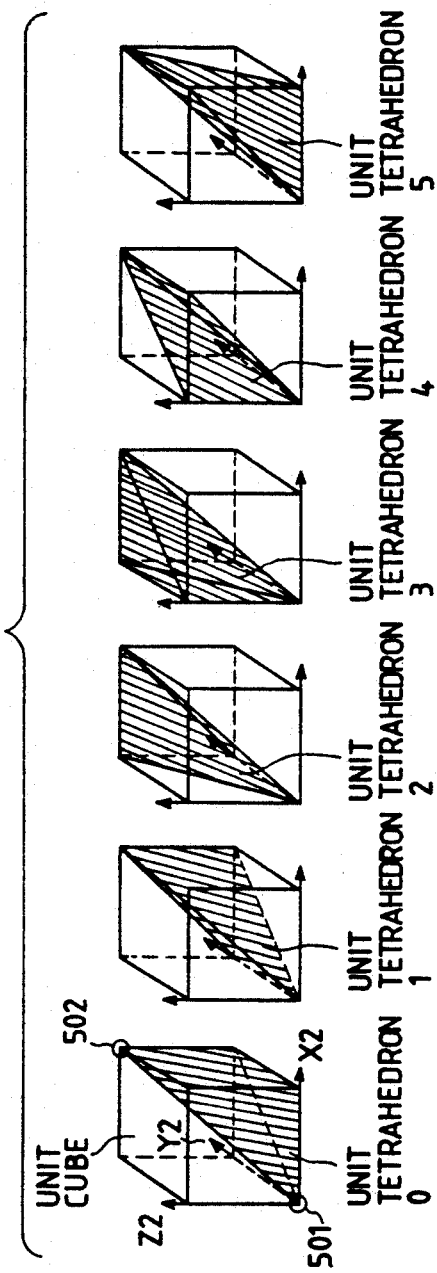
FIG. 5 is a diagram showing respective unit tetrahedra into which a unit cube is divided.

As shown in FIG. 5, each unit cube can be divided into six tetrahedra, which will be designated as unit tetrahedra 0 to 5 respectively. The four vertices of each of these unit tetrahedra coincided with four vertices of the unit cube, and two vertices (designated as 501 and 502 in FIG. 5) are common to all of the six unit tetrahedra 0 to 5. One of these, i.e. vertex 501, is designated as a common color transform reference point for all of the unit tetrahedra 0 to 5.

Thus, to obtain an interpolated color correction value, it is necessary to first specify (by the high-order bits (x1), (y1), (z1) of the input tricolor value combination) a specific unit cube within which the desired interpolation value is located, i.e. to specify a color transform reference value within the color space. Next, it is necessary to specify within which of the six unit tetrahedra of that unit cube the interpolation point is located. That unit tetrahedron is specified by the low-order bits (x2), (y2), (z2) of the input tricolor combination. The relationships between the respective values of the sets of low-order bits (x1), (y1), (z1) and the unit tetrahedra which these specify are given in Table 1 below.

TABLE 1

| UNIT TETRAHEDRON No. | max | mid | min |
|---|---|---|---|
| 0 | x2 | y2 | z2 |
| 1 | y2 | x2 | z2 |
| 2 | y2 | z2 | x2 |
| 3 | z2 | y2 | x2 |
| 4 | z2 | x2 | y2 |
| 5 | x2 | z2 | y2 |

In the above "max" denotes the set of low-order bits that has the maximum value among the three sets, "min" denotes the set having the lowest value, and "mid" denotes the set having the intermediate value of the three sets.

Once the specific unit tetrahedron within which an interpolation point is located in the color space has thus been determined, it is then possible to determine the exact interpolation value as a position within that unit tetrahedron. That is done by using the following equations:

$$O(x, y, z) = O1 + \sum_{i=2}^{4} Wi \times Di \qquad (6)$$

$$Wi = \Delta i / \Delta \qquad (7)$$

In the above, O(x,y,z) is the desired interpolated color correction value, O1 is the color correction value corresponding to the reference point, (i.e. to the vertex P1 in FIG. 6, described hereinafter, or to vertex 501 in FIG. 5), Di denotes the $i^{th}$ color transform difference value (of the three difference values of that unit tetrahedron), and Wi denotes the $i^{th}$ weighting coefficient, i.e.

the weighting coefficient by which the $i^{th}$ color transform difference value will be subsequently multiplied.

Figure 6:
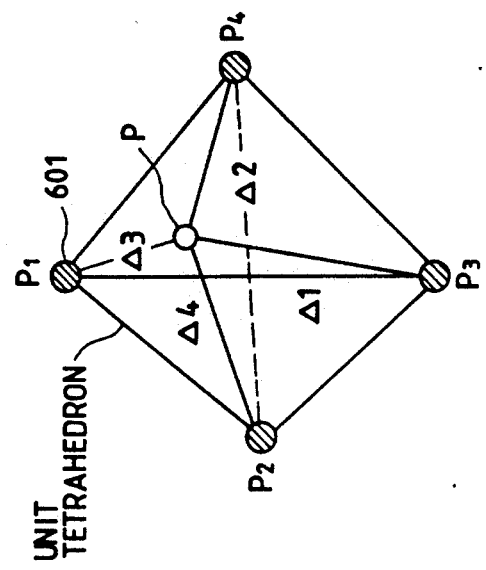
FIG. 6 is a diagram for illustrating a relationship between an interpolation point and a set of subtetrahedra within a unit tetrahedron.

Each unit tetrahedron can be divided, as shown in FIG. 6, into a set of four smaller tetrahedra (referred to in the following as sub-tetrahedra), by lines which extend from the desired interpolation point P to each of the four vertices P1, P2, P3 and P4 of the unit tetrahedron. The respective volumes of these subtetrahedra are designated as $\Delta 1$ to $\Delta 4$ in FIG. 6. In equation (7) above, $\Delta i$ designates the volume of the one of the four sub-tetrahedra which does not include the vertex Pi as one of its vertices. Thus for example in FIG. 6, $\Delta 1$ denotes the volume of the sub-tetrahedron which does not include the vertex P1 among its vertices. $\Delta$ denotes the volume of the entire unit tetrahedron.

Figure 7:
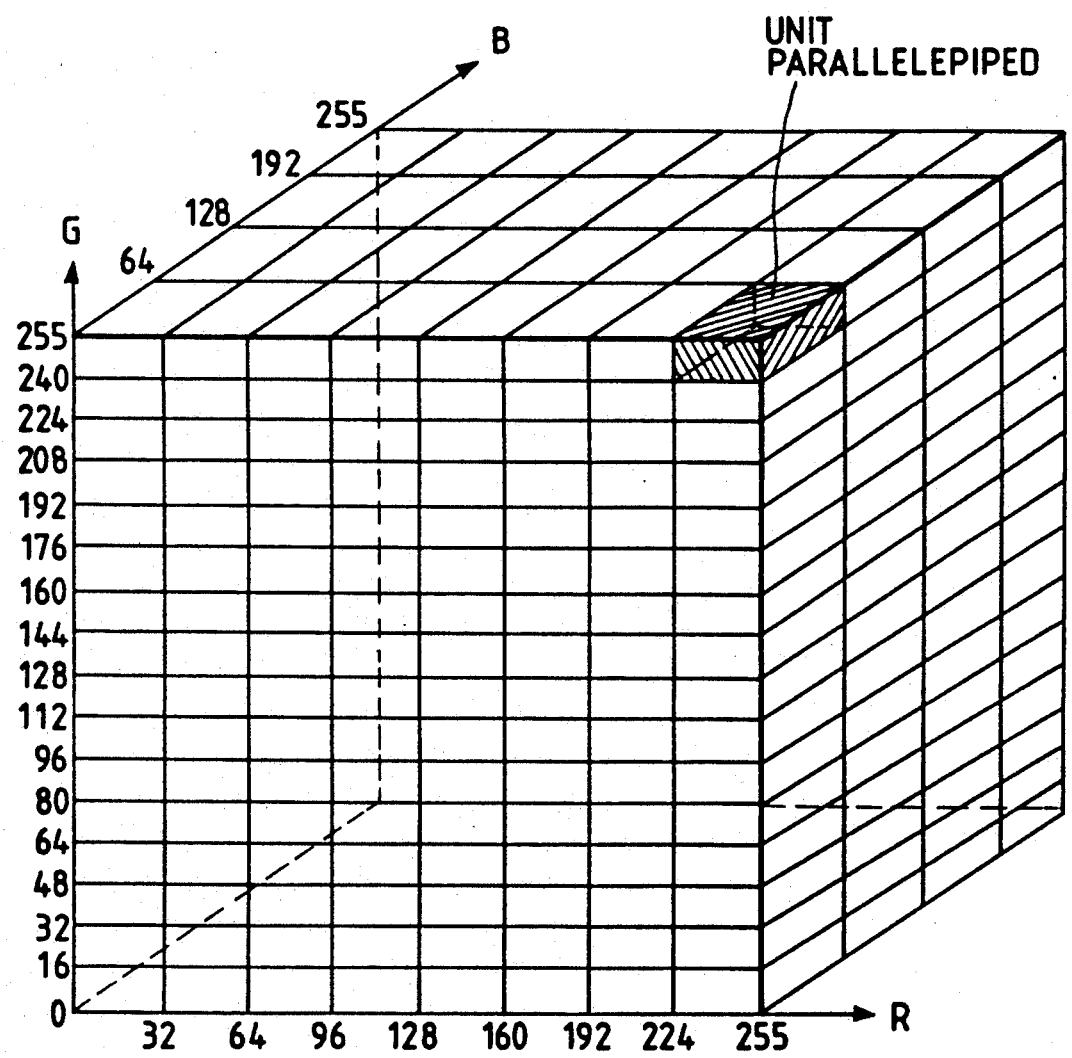
FIG. 7 shows an example of a color space formed of a regular array of unit parallelepipeds having sides of respectively different lengths.
Figure 8A:
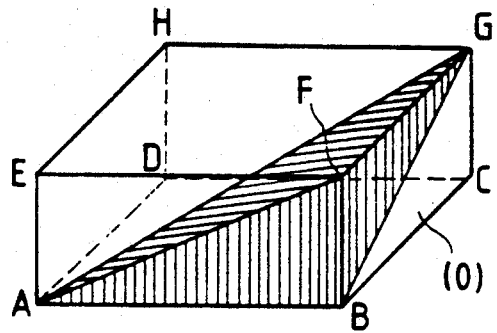
FIG. 8 show respective unit tetrahedra into which a unit parallelepiped is divided.
Figure 8D:
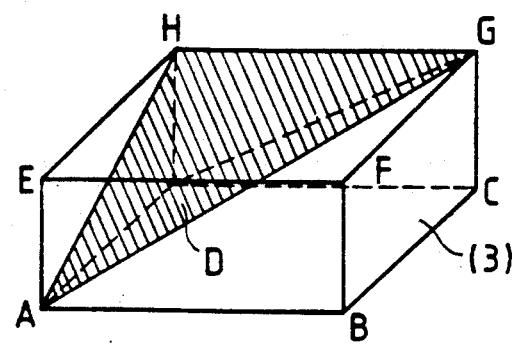
Figure 8B:
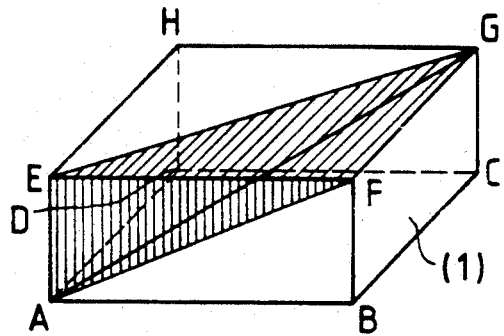
Figure 8E:
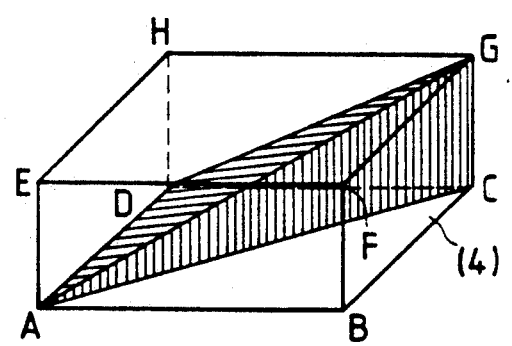
Figure 8C:
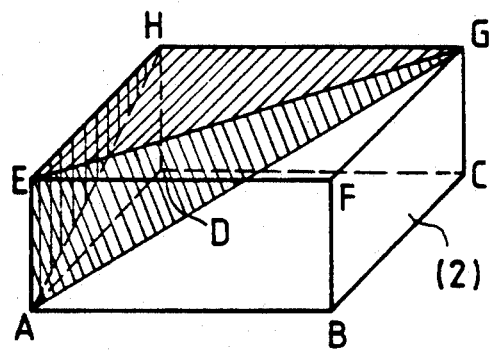
Figure 8F:
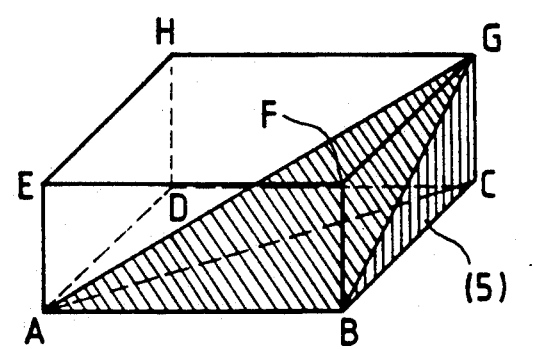

In the above description, it is assumed that the color space containing the color correction values is configured as shown in FIG. 4, i.e. is formed of a regular array of unit cubes, i.e. that identical numbers of high-order bits of each of the tricolor input digital values are used for three-dimensional addressing of the table memories. However it would be equally possible to make the number of one of the three sets of high-order bits (x1), (y1), (z1) different from that of the other two sets, for example to make (x1), (y1), (z1) equal to 3, 4 and 2 bits respectively. The three sets of low-order bits (x2), (y2), (z2) of each input (x)), (y)), (z) color value combination would then consist of 5, 4 and 6 bits respectively. In that case, the color space would be formed as a regular array of unit rectangular parallelepipeds (referred to in the following simply as unit parallelepipeds), each unit parallelepiped having sides of respectively different lengths (i.e. 32, 64 and 16 bits), as shown in FIG. 7.

Irrespective of whether the color space containing the color correction values is a regular array of unit cubes or unit parallelepipeds, a specific unit cube or unit parallelepiped is defined by the high-order bits of the input tricolor values, while a specific one of six unit tetrahedra within that unit cube or unit parallelepiped is selected in accordance with the states of the low-order bits of the input tricolor values.

FIG. 8 shows how a unit parallelepiped having sides of respectively different lengths can be divided into six unit tetrahedra 0 to 5.

An embodiment of a color value correction apparatus according to the present invention will be described referring to FIG. 1. With this embodiment, a first color space is used for a color transform operation to convert each R, G, B color value combination of a tricolor input signal to a corresponding red color correction value R', a second color space is then used to convert each R, G, B input value combination to a corresponding green color correction value G', and finally a third color space is used to convert each input value combination to a corresponding blue color correction value B'. In that way, red, blue and green corrected color separation images are successively obtained from a source image that has been scanned to produce the R, G, B tricolor input signals, e.g. for use in color printing. Each of the aforementioned three color spaces is defined by original color correction values held in a host computer (not shown in the drawing), which supplies color transform reference values and color transform difference values in accordance with these original color correction values, to be temporarily stored in table memories of the apparatus of FIG. 1, as described in detail hereinafter.

Only the operation of deriving the R' corrected output values will be described in the following. The R, G and B input color signals, designated by numerals 101, 102 and 103 respectively, each consist of successive 8-bit digital values, and are inputted to respective gamma conversion table memories 104, 105 and 106, for applying gamma conversion. That conversion determines the effective shape of the color space in which the input R, G, B signals are processed. Thus for example if each of the gamma conversion table memories 104 to 106 provides a logarithmic density conversion form of characteristic, then in effect, there will be higher density of points in regions of the color space lattice which correspond to relatively dark regions in the original image. Thus, greater accuracy of interpolation will be obtained for shadow regions of that image, in the output values obtained as a result of the transform processing.

The resultant gamma-converted output signals from the gamma conversion table memories 104 to 106 are designated by numerals 125, 126 and 127, and these will be expressed as a series of combinations of three 8-bit digital values ((x), (y), (z)). As described hereinabove, the three high-order bits of these values will be designated as (x1), (y1), (z1), constituting a high-order signal 107 in FIG. 1, while the five low-order bits will be designated as (x2), (y2), (z2), constituting a low-order signal 108.

The the weighting coefficient generating circuits 109, 110, and 111 each receive the low-order signal 108, and in response to each specific combination of (x2), (y2), (z2) values, determine which of the aforementioned six unit tetrahedra of a unit cube contains the interpolation point (that unit cube being specified by the high-order bits (x1), (y1), (z1) as described above), and respectively generate three corresponding weighting coefficients designated as W2 to W4. These are to be used in three parallel multiplication operations in accordance with ($w_i \times D_i$) in equation (6) described above. In this embodiment, each of the the weighting coefficient generating circuits 109, 110, and 111 contains circuits for computing the value of a weighting coefficient, based on equation (7) above. However it would be equally possible to implement each of the the weighting coefficient generating circuits 109, 110, and 111 as a table memory in which are stored a set of predetermined weighting coefficients that have been previously computed in accordance with equation (7).

The low-order bits (x2), (y2), (z2) are also inputted to a unit tetrahedron designating circuit 132, which also judges which of the six unit tetrahedra contains the required interpolated output value, and which outputs as a unit tetrahedron selection signal 133, a 3-bit output value representing a number in the range 0 to 5, for designating one of the six unit tetrahedra which are shown in FIG. 6.

The high-order signal 107 is transferred through respective ones of a set of address bus interface circuits 113a, 113b, 113c and 113d to address input terminals of three color transform difference value table memories 115, 116 and 117, and a color transform reference value table memory 118. The unit tetrahedron designation signal 133 is also transferred through the interface circuits 113a, and 113c to the address input terminals of the color transform difference value table memories 115 and 117. The color transform reference value table memory 118 stores reference values for all of the unit cubes of the color space, i.e. each value corresponding to a reference point 501 indicated in FIG. 5 (corresponding to one vertex of the cube), which is common to all of the six unit tetrahedra of the cube. The color transform difference value table memory 117 stores, for each unit cube, the one of the 7 color transform difference values (corresponding to the remaining 7 vertices) of that cube which is common to each of the unit tetrahedra of the cube, i.e. corresponding to the point 502 in FIG. 5. Of the remaining two color transform difference values of each unit tetrahedron in a unit cube, a predetermined one of these color transform difference values is stored in the color transform difference value table memory 115, and the remaining difference value is stored in the color transform difference value table memory 116.

Thus it is only necessary to supply the high-order bit signal 107 to address each of the table memories 117, 118, to thereby specify one particular unit cube, whereas it is necessary to supply both the high-order bit signal 107 and also the unit tetrahedron designation signal 133 to address each of the table memories 115, 116, since in that case it is necessary to designate both one specific unit cube and also one specific unit tetrahedron within that unit cube.

The high-order bit signal 107 is transferred to address input terminals of the table memories 115 to 118, and the unit tetrahedron designation signal 133 is transferred to address input terminals of the table memories 115, and 117, via four address bus interface circuits 113a to 113d, as shown. Addresses can also be supplied to the table memories 115 to 118 from a host computer (not shown in the drawing) via an address bus 114. Similarly, the output color transform difference values from the table memories 115 to 117 and the output reference values from the table memory 118 are transferred out through respective data bus interface circuits 119a to 119d respectively, through which data can also be transferred (in the opposite direction) from the host computer to be applied to data input terminals of the table memories 115 to 118, to be written into these table memories under the control of a read/write control signal (not shown in the drawings) supplied from the host computer.

The difference values produced from the table memories 115 to 117 are transferred to one input of each of three multipliers 121a, 121b and 121c, and each color transform reference value produced from the table memory 118 is transferred to one input of an adder 122b. The product output signals produced from the multipliers 121a, 121b are inputted to an adder 122a, while the product output signal from the multiplier 121c and the output signal 137 from the color transform reference value table memory 118 are summed in an adder 122b, with the sum outputs from the adders 122a, 122b being added in an adder 123. In the output values produced from the weighting coefficient generating circuits 109 to 111, instead of being generated as a value in the range 0 to 1, each weighting coefficient is represented such that an actual coefficient value of 1 is outputted as 255, an actual coefficient value of 0.5 is outputted as 125, and so on. Thus it is necessary to apply an 8-bit right shift operation to the sum result obtained from the adder 122b. The resultant value is then supplied as an address input to a table memory 124, which provides a predetermined non-linear relationship between input values supplied thereto and resultant output values. The output corrected color values can thereby be modified in accordance with a characteristic having an arbitrary curvature. A final corrected color signal 125, e.g. the R' signal, is thereby obtained as the final output.

The operation of the color value correction apparatus of FIG. 1 for the case of obtaining a corrected red (R') color separation image from an original color image is as follows. It will be assumed that values for providing desired gamma conversion of each of the R, G and B input signals have been previously set in the conversion table memories 104, 105, 106, and that color transform difference values have been previously down-loaded into the table memories 115 to 117 and reference values down-loaded into the table memory 118, from the host computer, in accordance with red (R') color correction values corresponding to respective lattice intersection points in a color space that is of the form shown in FIG. 4. Successive sets of R, G, B 8-bit digital values, e.g. produced by optical scanning of a source image, are supplied to the apparatus, with the 3 high-order bits of each set of the gamma-converted R, G and B values being supplied to address inputs of the table memories 115 to 118, and the 5 low-order bits of each of these sets of gamma-converted R, G, B values being supplied to the the weighting coefficient generating circuits 109, 110, and 111. The weighting coefficient generating circuits 109, 110, and 111 respond by respectively outputting three weighting coefficients, W2, W3 and W4, for use in the equation (6) above, computed based on equation (7) above. In response to one set of R, G, B gamma-converted values, the unit tetrahedron designating circuit 132 generates a value specifying the one of the unit tetrahedra (0 to 5) containing the interpolation point, with that value being determined in accordance with Table 1 above. In response to the respective values of the high-order bits of the gamma-converted R, G, B set, the table memory 118 outputs the color transform reference value (i.e. color correction value corresponding to the reference point of that unit tetrahedron), which is the value 01 for use in equation (6) above, and the table memory 117 outputs a color transform difference value D4, for use in equation (6). In response to the values of the high-order bits of the R, G, B set in conjunction with the output value produced from the unit tetrahedron designating circuit 132, the table memories 115 and 116 output respective color transform difference values D2 and D3, for use in equation (6).

It can thus be understood that at this stage, all of the values required for a computation in accordance with equation (6) are being supplied to the arithmetic processing circuit that is constituted by the multipliers 121a, 121b and 121c and by the adders 122a, 122b, and 123. Hence, the desired interpolated color corrected R' value is computed, and outputted after being modified (if necessary) by the output table memory 124.

Upon completion of the above process for all of the R, G, B color value combinations produced by scanning the original image, color transform difference values and reference values for use in obtaining interpolated green (G') corrected color values are down-loaded into the table memories 115 to 118 from the host computer, and the above process is repeated, to obtain a color-corrected green separation image. The same process is then repeated to obtain a color-corrected blue separation image.

In the above description it has been assumed that interpolation is executed in a 3-dimensional color space, i.e. that tricolor R, G, B or C, M, Y input color values are processed to obtain color-corrected output values. However it would be possible to apply the same principles to the case of interpolation in a color space having an arbitrary number of dimensions, so that for example such an apparatus could be applied in the case when successive sets of C, M, Y, B (cyan, magenta, yellow, black) color signal input values are supplied.

Figure 1:
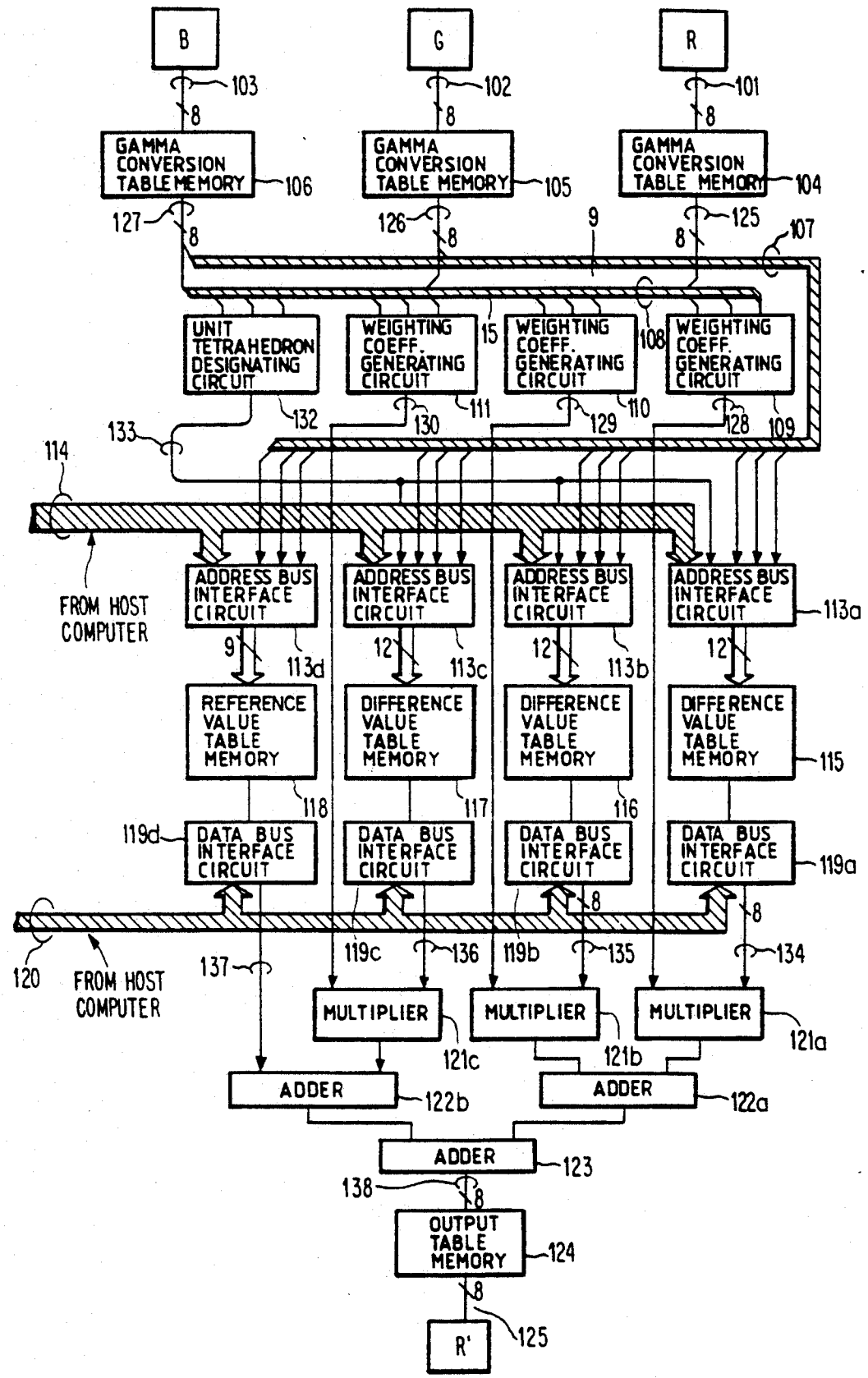
FIG. 1 is a general block diagram of an embodiment of a color value correction apparatus according to the present invention.

Furthermore in the above description of the embodiment of FIG. 1, it is assumed that equal numbers of high-order bits of each set of tricolor input values are used to address the table memories 115 to 118, so that color transform operations are executed in a color space formed of an array of unit cubes. However it would be equally possible to make these numbers of high-order bits respectively different, so that the color transform operations are executed in a color space formed of an array of elongated unit rectangular parallelepipeds, as shown in FIG. 7, e.g. to obtain a greater accuracy of interpolation for input color values which are close to the green axis (G) of the color space.

It will be understood from the above description that a color value correction apparatus in accordance with the present invention can provide a very high speed of operation, since arithmetic processing to obtain output color correction values is executed by parallel operation, on data values that are read out in parallel from a set of four table memories. It can further be understood that a total of only three multipliers is required for that arithemetic processing, so that the hardware requirements of the apparatus are limited, by comparison with a prior art color value correction apparatus using interpolation based on unit tetrahedra which form unit cubes within a color space.

It can moreover be understood that since the range of amplitudes of the color transform difference values that are stored in the table memories 115 to 117 will be substantially smaller than that of the color correction values from which these difference values were derived, more effective use of memory capacity can be achieved, by comparison with a color value correction apparatus in which color correction values must be stored in three table memories corresponding to the table memories 115 to 117, i.e. which does not utilize color transform difference values to obtain interpolated color correction values.

Furthermore, as described hereinabove referring to FIGS. 7 and 8, it is possible with a color value correction apparatus according to the present invention to use respectively different numbers of high-order bits of a set of tricolor input data values for addressing the table memories in which are stored color transform difference values and reference values for use in interpolation, to thereby execute interpolation within elongated unit parallelepipeds in the color space, for thereby obtaining a greater degree of accuracy of interpolation along a specific axis of the color space, e.g. the green axis. The effective accuracy of interpolation can thereby be enhanced, based on the human visual response characteristics.

Moreover, as described with reference to the preferred embodiment, the invention enables the color transform difference values and reference values that are held in table memories, for use in computing interpolated color correction values, to be freely changed at any time, by loading arbitrarily determined values into the table memories from a host computer. Thus such a color value correction apparatus has wide applicability, and can be rapidly adapted to various types of color correction processing, by altering a program which is run by the host computer.

In the appended claims, the term "rectangular parallelepiped" is used therein to signify both a rectangular parallelepiped having sides of respectively different lengths and one having sides which are of identical lengths, i.e. a cube.

What is claimed is:

1. A color value correction apparatus for converting each of successive sets of tricolor digital values of a tricolor input signal into a corrected output color value, comprising:

input means receiving said tricolor input signal for supplying said tricolor digital values;

a color transform reference value random access memory (RAM) (118) having stored therein a plurality of color transform reference values, each of said reference values being a color correction value corresponding to one specific vertex of one of an array of unit rectangular parallelepipeds constituting a 3-dimensional color space, each of said unit rectangular parallelepipeds being divided into a set of unit tetrahedra each having said color transform reference value corresponding to a common vertex thereof;

first, second and third color transform difference value random access memories (RAMs) (115, 116, 117) having stored therein a plurality of respective color transform difference values of respective dimensions of said 3-dimensional color space, each of said difference values being a difference between a color correction value corresponding to a vertex of one of said unit tetrahedra and said color transform reference value of the unit tetrahedron;

unit tetrahedron designation means (132) responsive to respective sets of low-order bits of said each set of tricolor digital values for producing an output value indicating a specific one of said unit tetrahedra which contains an interpolation color correction value of said each set, said color transform reference value random access memory being three-dimensionally addressed by, and responsive to, respective sets of high-order bits of said each set of tricolor digital values, for supplying an output signal corresponding to said reference values, and said first, second and third difference value random access memories being addressed three-dimensionally and in parallel by respective ones of said sets of high-order bits in conjunction with said output value from said unit tetrahedron designation means, for supplying, in parallel, first, second and third signals representing respective output difference values corresponding to respective vertices of said specific one of the unit tetrahedra, within a specific one of said unit rectangular parallelepipeds;

weighting coefficient generating means (109, 110, 111) responsive to said low-order bits for generating three weighting coefficients respectively corresponding to said first, second and third signals representing respective output difference values; and an arithmetic processor for operating in parallel on said first, second and third signals representing respective output difference values and a corresponding one of the reference values in conjunction with said three weighting coefficients, for producing an interpolated corrected color value corresponding to said each set of tricolor digital values.

2. A color value correction apparatus according to claim 1, in which said first, second and third color transform difference value random access memories (RAMs) comprise a first table memory (115) for storing one difference value corresponding to one vertex, for each of said unit tetrahedra, a second table memory (116) for storing one difference value corresponding to a second vertex, for each of said unit tetrahedra, and a third table memory (117) for storing one difference value corresponding to a third vertex, for each of said unit tetrahedra, for storing difference values respectively corresponding to three different apexes of each of said unit tetrahedra.

3. A color value correction apparatus according to claim 2, in which each of said unit rectangular parallelepipeds is divided into six of said unit tetrahedra, and in which one of said table memories (117) stores, for each of said unit rectangular parallelepipeds, one difference value that is common to all of the unit tetrahedra of that unit parallelepiped.

4. A color value correction apparatus according to claim 2, and further comprising means for setting arbitrary data values, supplied from external data value supplying means, into said color transform reference value random access memory (RAM) and said first, second and third color transform difference value random access memories (RAMs)

5. A color value correction apparatus according to claim 1, in which said sets of high-order bits of each of said sets of tricolor digital values are of respectively different size.

6. A color value correction apparatus according to claim 1, in which said arithmetic processor includes first, second and third multipliers for respectively multiplying said first, second and third signals representing respective output difference values by corresponding ones of said three weighting coefficients, by parallel operation.

* * * * *